UNITED STATES PATENT OFFICE.

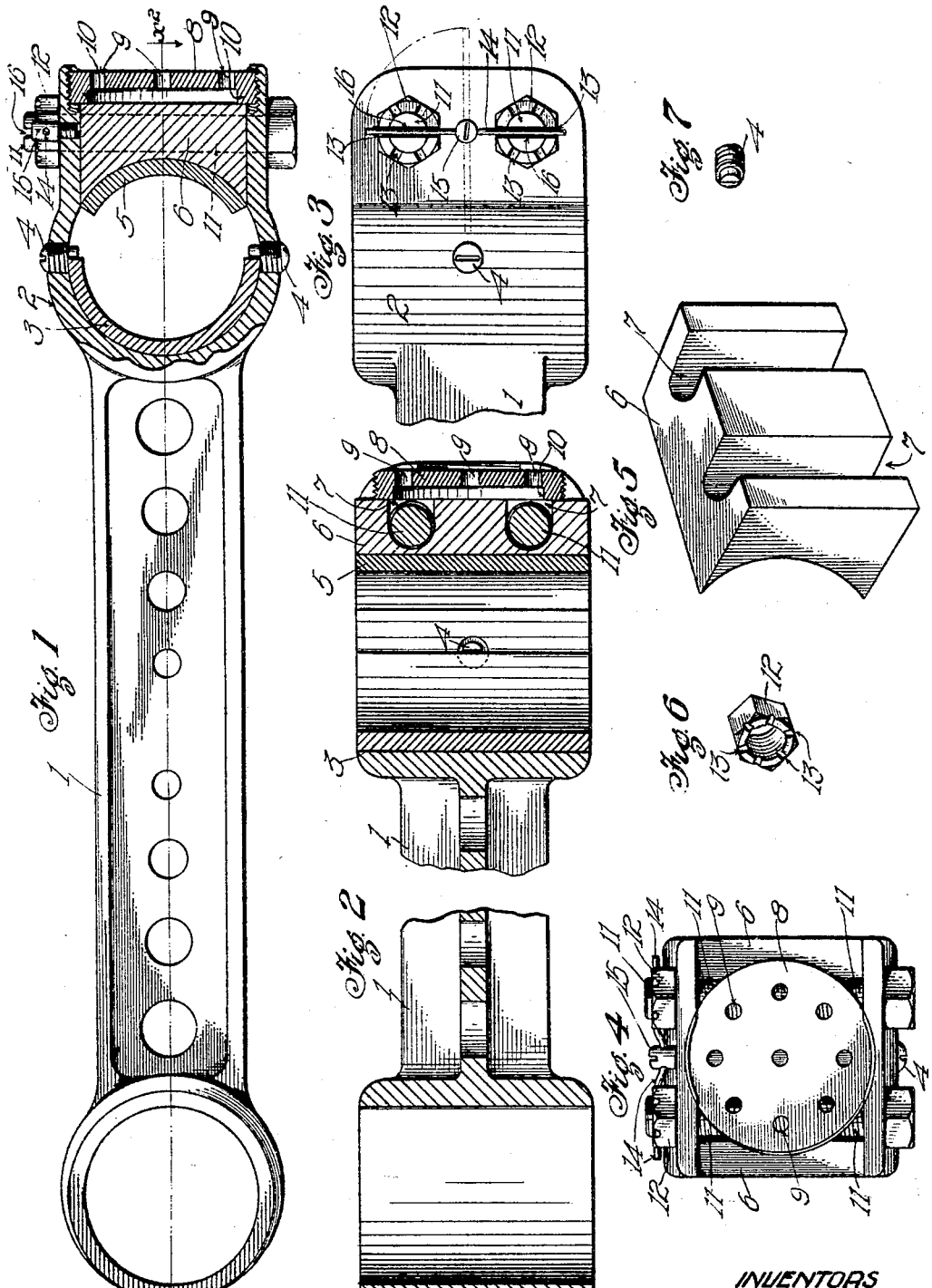

ROSS M. G. PHILLIPS AND JAMES A. WALKLEY, OF LOS ANGELES, CALIFORNIA.

CONNECTING-ROD.

No. 800,592. Specification of Letters Patent. Patented Sept. 26, 1905.

Application filed March 3, 1904. Renewed February 17, 1905. Serial No. 246,018.

*To all whom it may concern:*

Be it known that we, Ross M. G. PHILLIPS and JAMES A. WALKLEY, citizens of the United States, residing at Los Angeles, in the county of Los Angeles and State of California, have invented a new and useful Connecting-Rod, of which the following is a specification.

This invention relates particularly to a connecting-rod designed for use with an internal-combustion engine; and the main object of the invention is to provide a novel construction of the crank end whereby the outer brass and its retaining-block in the crank end may be adjusted by a screw to take up wear or be readily removed, so as to leave a slot extending from the crotch clear to the end of the connecting-rod. After the removal of the outer brass and its retaining-block the width of the slot thus formed is at least equal to or greater than the diameter of the crank-pin, so that the connecting-rod may readily be withdrawn. Thus it will be seen that the connecting-rod is especially adapted for use on engines in which the crank-pin is supported by double cranks or on an engine in which the crank-shaft, crank, and crank-pins are formed of a single piece.

Another object of the invention is to provide a novel and effective device for locking the retaining-block in place.

The accompanying drawings illustrate the invention, and referring to the same—

Figure 1 is a side elevation of the connecting-rod, the crank end being shown in section. Fig. 2 is a section on line $x^2$ $x^2$ in Fig. 1, a central portion of the crank being broken away to contract the view. Fig. 3 is a plan view of the crank end of the connecting-rod. Fig. 4 is an end elevation of the crank end. Fig. 5 is a perspective of the retaining-block. Fig. 6 is a perspective of a lock-nut. Fig. 7 is a perspective of one of the screws used for retaining one of the brasses.

1 designates the shank of the connecting-rod, which at the crank end is forked, as at 2, and one brass 3 is supported in the crotch of the fork by means of screws 4. The inner projecting ends of the screws 4 are cut or squared off, so as to form projections, the flat faces of which support the edges of the brass 3, preventing it from slipping around, and the screws 4 are by the same construction prevented from unscrewing. The outer segmental brass 5 embraces less than half a circle, and the chord of its arc is not greater than the space between the two arms of the forked end of the connecting-rod. The brass 5 rests upon a saddle or retaining-block 6, which is provided with two slots 7.

The retaining-block 6 may be adjusted toward or from the other brass to take up wear by means of a nut 8, which engages screw-threads on both arms of the fork of the connecting-rod, as shown in Figs. 1 and 4. The nut 8 is provided with perforations 9 for receiving a spanner-wrench to turn the nut and has a rim 10, which bears against the block 6.

After the nut 8 has been set to give the block 6 and its brass 5 the proper position the nut and block may be clamped securely by bolts 11, which pass through the forked end of the connecting-rod and through the slots 7 in the block 6. The nuts 12, which are provided on the bolts 11, may have notches 13 on their upper faces adapted to receive a wire 14, which is carried by a screw 15. The ends of the bolts 11 are also notched, as at 16, to permit the wire 14 to enter the notches in the nuts 12. By springing up the ends of the wire it may be turned with the screw 15 acting as a swivel into the position indicated by dotted lines in Fig. 3, which will release the nuts 12, permitting the retaining-block 6 and the nut 8 to be loosened for adjustment of the brass 5 or removal of the block and brass.

We are aware that the crank ends of connecting-rods have been made forked and that straps, wedges, &c., have been utilized for holding the brasses in place and adjusting them for taking up wear, and we do not, therefore, claim a forked construction broadly, but regard the screw in the forked end for adjusting the block and brass, together with a suitable means for clamping the same, such, for instance, as the bolts shown, to be new and of considerable value.

Other minor features of the invention which we consider to be within the spirit of our invention are set forth in the claims.

What we claim is—

1. A connecting-rod having a forked end, a suitable bearing device in the forked end, a screw in the forked end for adjusting the bearing device, and means for contracting the fork members to clamp the screw.

2. A connecting-rod having a forked end, a bearing-block in the forked end, there being separate but related screw-threads on the inner opposite faces of the fork, and a screw engaging said threads for adjusting the bearing-block.

3. A connecting-rod having a forked end, a slotted bearing-block in the forked end, there being opposite related screw-threads on the inner faces of the fork, a screw engaging said threads for adjusting the bearing-block, and a bolt through the fork and slotted block for clamping the block and screw.

4. A connecting-rod having a forked end, a bearing-block in the forked end having two open slots, there being opposite related screw-threads on the inner faces of the fork, bolts through the fork and slotted block for contracting the fork, a screw in the fork engaging the threads for adjusting the block, a brass in the crotch of the fork, and screws in the fork having protruding flattened ends which engage the edges of the brass.

5. A connecting-rod having a forked end, a brass in the crotch of the fork, and screws in the fork having protruding flattened ends which engage the brass.

6. A connecting-rod having a forked end, a slotted bearing-block in the forked end, there being opposite related screw-threads on the inner faces of the fork, a screw engaging said threads for adjusting the bearing-block, a bolt through the fork and slotted block for clamping the block and screw, a nut for the bolt, and means for locking the nut.

7. A connecting-rod having a forked end, a bearing device at the forked end, suitable means in the forked end for adjusting the bearing device, and means for contracting the fork members to clamp the adjusting means.

In testimony whereof we have signed our names to this specification, in the presence of two subscribing witnesses, at Los Angeles, in the county of Los Angeles and State of California, this 24th day of February, 1904.

ROSS M. G. PHILLIPS.
JAMES A. WALKLEY.

Witnesses:
GEORGE T. HACKLEY,
JULIA TOWNSEND.